United States Patent [19]

Share et al.

[11] Patent Number: 5,603,976
[45] Date of Patent: Feb. 18, 1997

[54] METHOD OF REDUCING THE ANIMAL FAT CONTENT OF MEAT PRODUCTS

[75] Inventors: Richard A. Share, Long Grove; Richard T. Broz, Hawthorn Woods, both of Ill.

[73] Assignee: Lifewise Ingredients, Inc., Buffalo Grove, Ill.

[21] Appl. No.: 418,784

[22] Filed: Apr. 7, 1995

(Under 37 CFR 1.47)

Related U.S. Application Data

[63] Continuation-in-part of Ser. No. 163,983, Dec. 7, 1993, abandoned.

[51] Int. Cl.$^6$ .................................................. A23L 1/314
[52] U.S. Cl. ........................... 426/574; 426/92; 426/104; 426/646; 426/804
[58] Field of Search ................................ 426/92, 96, 89, 426/104, 573, 574, 575, 646, 804, 802

[56] References Cited

U.S. PATENT DOCUMENTS

| | | | |
|---|---|---|---|
| 3,658,550 | 4/1972 | Hawley | 426/574 |
| 5,100,688 | 3/1992 | Cox et al. | 426/573 |
| 5,236,734 | 8/1993 | Fuisz | 426/646 X |
| 5,422,136 | 6/1995 | Fuisz | 426/574 X |

*Primary Examiner*—Arthur L. Corbin
*Attorney, Agent, or Firm*—Eugene I. Snyder

[57] ABSTRACT

An animal fat replacement product of an aqueous gel of one or more dextrins, each of dextrose equivalent less than 20, entrapped in a matrix of an alginate, gum, pectin or Konjae can be effectively used in meats and meat products without adverse organoleptic consequences. The fat mimetic, which can be generally used to replace animal fats, provides excellent lubricity and juiciness while being "rendered" under appropriate conditions, thus behaving quite similarly to animal fat. The animal fat replacement product also is an excellent vehicle for incorporation of other agents often added to meats, such as flavors, colors, preservatives, and so forth.

18 Claims, No Drawings

METHOD OF REDUCING THE ANIMAL FAT CONTENT OF MEAT PRODUCTS

CROSS REFERENCE TO RELATED APPLICATION

This application is a continuation-in-part of our application, Ser. No. 08/163,983, filed Dec. 7, 1993, now abandoned, which is incorporated herein.

FIELD OF THE INVENTION

This invention relates to the preparation of low fat meats and meat products and a product therefor. In particular, this invention relates to the replacement of animal fats in meats while affording a final product as close as possible to the animal fat-containing product vis a vis consumer acceptance.

BACKGROUND OF THE INVENTION

Although fat is an indispensable part of our diets we tend to have too much fat as part of our regular diet. Excess fat intake has been identified as a major factor in ailments of civilized societies; the American Heart Association recommends that no more than 30% of total caloric intake be derived from fat to help minimize such health problems as cardiovascular disease. Not only is fat thought to be a specific contributing factor in certain increasingly common ailments, but it also contributes to an excessive calorie intake common in the United States as well as in other countries. With increasing recognition of this fact in recent years has come increasing research and development efforts to produce foods with lower calories through reduction of their fat content. The challenge is considerable, for the quest is to develop fat-free or reduced fat foods, such as meats and meat products, while retaining the characteristics of full-fat products. Thus, one desires to develop a meat product with the texture and organoleptic properties of meat, including localized tenderness, juiciness and lubricity and which undergoes "rendering" upon heating, by substituting the animal fat normally present with a product which is inexpensive, has few or no calories, is odorless, and which can be incorporated into meat like animal fat.

The concept of localized tenderness, juiciness, and lubricity is important in understanding the organoleptic and textural properties of meat. Animal fat occurs in pockets within the lean portion of meats, and if absent the resulting cooked meat would be very tough and rubbery, as the meat proteins would be able to form a very tightly bound network of interlinked molecules. The animal fat present serves several functions in tenderizing the protein structure. Specifically, the space taken up by the animal fat piece physically creates a region where the proteins cannot link to each other tightly. In addition, during cooking the triglyceride portion of the animal fat renders out of the pocket and penetrates the surrounding tissues, providing further interference with the formation of tightly bound proteins in the area adjacent to the pocket, leading to localized tenderness. It follows that, e.g., a hamburger patty is homogeneous in neither its composition nor its texture. During mastication the meat patty structure breaks down, first along those areas adjacent to a particle of fat, then on the rubbery lean sections.

If one merely added a triglyceride to, say, 95% lean ground meat in a proportion to yield a 70% lean product the latter no longer will have pockets of fat, but instead the fat will be distributed more homogeneously and will not manifest the local functionality as described above. In particular, the meat will be more crumbly and, if cooked to well doneness, will be friable and no longer rubbery like a regular 70% lean patty. Therefore, to deliver equivalent sensory properties to lean meats, a fat mimetic also must take into account the phenomenon of localized tenderization as well as lubricity, bite, and juiciness.

Fat replacers can arbitrarily be divided into the two categories of fat substitutes and fat mimetics. Fat substitutes, sometimes referred to as "synthetic fats", are materials which resemble natural fats both chemically and functionally, that is, they are chemically related to the triglycerides constituting fats and they function like fats even as to such properties as frying. Such materials are represented by malonate esters (U.S. Pat. No. 4,582,927), sucrose polyesters (U.S. Pat. No. 3,600,186), esterified propoxylated glycerols (U.S. Pat. No. 3,793,380; EP254,547), alpha-acylated glycerides (U.S. Pat. No. 4,582,715), alkyl glycoside polyesters (U.S. Pat. No. 4,942,054) and polyglycerol fatty acids (U.S. Pat. No. 3,637,774). It is essential to recognize that the term "fat substitutes" as used here denotes a class of esters which perforce are chemically analogous to natural fats and oils, and whose functional behaviour also is quite similar to the natural fats and oils. As will be better appreciated from the description within, our invention differs fundamentally from those incorporating "fat substitutes" in that the problem faced is that of making a product fat-like without adding a fat or oil, or any other material chemically analogous to a fat or oil.

Fat mimetics resemble natural fats only functionally and represent a diverse class chemically quite different from the triglycerides of natural fats. Fat mimetics include such materials as starch hydrolysate products, including maltodextrins, microparticulates, hydrocolloids, hemicelluloses, and beta-glucans, among other materials. See "Development of Low Fat, Low Caloric Food Products", given at East Brunswick, N.J., Dec. 11, 1991. For example, particles ranging in size from 0.1–3.0 microns are perceived as creamy, especially when the particles are spherical, irrespective of the nature of the particles. Thus, microparticulates suitable as fat mimetics include proteins, (e.g., Simplesse™, a microparticulated protein of uniform spherical particles about 1 micron in diameter) as well as cellulose (microcrystalline cellulose, Avicel™ and microfibrillated cellulose) and carbohydrate crystallites (Stellar™). Of particular interest to us here are hydrocolloids such as alginates, carrageenans, and agar and the partially hydrolyzed starches, especially low dextrose equivalent dextrin.

Carrageenan and other gums, especially seaweed extracts and locust bean gum, have a high binding capacity for water, a property which has led to their introduction into meats as an animal fat replacement. Such materials form a gel with water which is readily incorporated into meat products. For example, carrageenan either alone or in combination with non-meat proteins and starches has been used as an animal fat replacer in a variety of meat products, especially frankfurters, beef patties, and low-fat sausages. See, for example, L. Hoegh, "Food Ingredients Europe Conference Proceedings", 1991, pages 305–10; H. W. Hoogenkamp, idem., 311–314. A commercial product of carrageenan, water, and flavors (CarraFat™) has been touted as an animal fat-replacement "wonder product".

Sodium alginate is another gel-forming seaweed extract which differs from carrageenan in that gel formation occurs only in the presence of divalent cations such as calcium or magnesium. Recently a process for preparing alginate gel-structured meat products has been described in U.S. Pat. No. 4,603,054. Although meat products based on carrageenan and alginated gels alone form an advance in the art, especially in the context of animal fat reduction, the texture and mouth feel of the resulting product is not equivalent to a full-fat product, and the meat does not behave as does a full-fat product upon cooking.

Recently partially hydrolyzed starches, such as various maltodextrins, have found increasing use as fat mimetics because of their gel-forming properties which contribute some of the same sensory characteristics as do fats. Maltodextrins from such diverse sources as rice, oats, tapioca and potatoes have been used as fat replacers and seem to show exceptional flavor release. For example, oat maltodextrin containing 1–12% beta-glucan soluble fiber in combination with water (1:3) forms a thermoreversible gel having a fat-like mouth feel and a creamy texture. J. F. Kacher, "Food Ingredients Europe Conference Proceedings", 1991, pages 168–172. Low DE (dextrose equivalent) potato starch maltodextrins (DE $\leq 5$) have been reported as partial fat replacements in salad dressings and margarine. V. De Coninck and J. Vanhemelrijck, idem., 173–7. Although the gel-forming properties of maltodextrin were required in the foregoing applications, U.S. Pat. No. 4,536,408 utilizes a quite different approach where starch hydrolysates of DE$\leq$25 are used to promote a water-in-oil emulsion with a natural fat and gel formation of the starch hydrolysate must be avoided.

Our approach to the design of an animal fat replacement product differs substantially from that of the prior art even though a superficial examination may not reveal the profound underlying difference. What we have done is to structure water to behave like an animal fat in meat. In particular, fats in meats are present as a triglyceride in a collagen network, and the prior art appears to have completely ignored the network or matrix aspect of meat fat. In contrast, we believe the network is an essential aspect of fat functionality in meats which needs to be duplicated in an animal fat replacement product to afford a material with the proper texture, lubricity, and juiciness. Our product is a combination of a maltodextrin, optionally starch, and water entrapped in an alginate matrix. The product itself is a white solid which looks and feels like animal fat when cold, and which can be combined with meat in the same manner as is animal fat. When heated the maltodextrin-water gel melts, leaks from the matrix, and tenderizes the meat while leaving behind the alginate network which can be clear, opaque, or colored, which has a rubbery texture, and which chews like animal fat. The result is a meat which chews and feels to the bite the same as does a full-fatter meat product. An advantage of our product is that liquid is released upon heating analogous to fat rendering, hence the meat is locally tenderized and behaves similarly to a full-fat product upon cooking. Another advantage of our product is that it is an excellent delivery system for additional ingredients, especially flavoring additives.

SUMMARY OF THE INVENTION

A purpose of our invention is to make available a triglyceride- and ester-free material suitable for total or partial replacement of animal fat in meat products with little or no deleterious effect on the organoleptic properties of the reduced animal fat meat products. An embodiment comprises an aqueous gel of at least one maltodextrin, of DE $\leq 20$, entrained in an alginate matrix. In a more specific embodiment, the gel contains from 10 to 30 weight percent maltodextrins. In a still more specific embodiment the maltodextrins have a DE $\leq 10$. In yet another embodiment the gel contains a modified food starch and a lesser level of maltodextrins. Other embodiments and purposes will be apparent from the ensuing description.

DETAILED DESCRIPTION OF THE INVENTION

A typical problem with a low-fat meat product is that the product changes dramatically upon substitution of animal fat by fat mimetics, usually becoming too chewy and too grainy. What we have done is to restructure a material into a semi-solid state so that it can be incorporated into meat just like an animal fat. Our animal fat replacement product is a rigid case of material which looks and feels like animal fat and which is designed to go through cutters and choppers as does animal fat itself. Its incorporation into the meat affords lubricity, provides a locus from which tenderization can occur, and imparts to the meat a good texture and juiciness. By diluting the protein initially present, the resulting product tastes more like a full-fat product. For example, if an 85% lean hamburger is diluted 30% with the product of our invention the resulting meat product tastes and behaves like 70% lean hamburger, but actually is 90% lean. Because our material has approximately ⅙ calories of the same weight of animal fat, the "70% lean" described above has approximately one-half the calories of a natural, full-fat 70% lean hamburger. What we have done is to replace the structure in which fat is naturally found in meat with an analogous structure consisting largely of water, but containing maltodextrins, and optionally food starch, all of which are entrapped in an alginate matrix.

For the purpose of this application "meat" means the part of the muscle of cattle, buffalo, sheep, swine, goat, chicken, turkey, duck, quail, or ostrich, which is skeletal, or which is found in the tongue, in the diaphragm, in the heart or esophagus with or without the accompanying overlying fat, and the portion of bone, skin, sinew, nerve and blood vessels which accompany the muscle tissue and which are not separated from it in the dressing process. The term "meat product" means any article of food, or any article intended for, or capable of being used as human food, which is derived or prepared, in whole or in substantial and definite part, from any portion of any cattle, buffalo, sheep, swine, goat, chicken, turkey, duck, quail or ostrich, as long as the article contains three weight percent or more meat.

At the outset it needs to be expressly articulated that the animal fat replacement product of our invention may be utilized for a variety of purposes. At one extreme is its use as a total replacement of fat in a meat product to afford a "no fat" food. Although in some aspects this may be the most attractive outlet it may be too impractical, or afford a less desirable product than that resulting from the partial replacement of fat to afford a low fat meat product. An example of partial fat replacement was given above for 85% lean hamburger converted into a 90% lean hamburger which actually had the organoleptic properties of a 70% lean product. Finally, the animal fat replacement product of our invention may be used as a meat extender, although this is seen more as a possibile use than as a probable one.

One class of components of the animal fat replacement products of our invention consists of starch hydrolysates which act to bind water. If water is not held tightly enough by the starch hydrolysate, the resulting meat is mealy and/or flaky. On the other hand, if water is held too tightly by the starch hydrolysates the meat is tough and not at all juicy. Furthermore, the starch hydrolysate utilized must bind water sufficiently to go through a freeze-thaw cycle but must be rendered out at frying temperatures. The starch hydrolysates used in the practice of our invention are maltodextrins. By "maltodextrin" is meant a starch hydrolysate of dextrose equivalent of at least 1 but less than 20; see Kirk-Othmer, "Encyclopedia of Chemical Technology," 3rd edition, J. Wiley and Sons, V.22, pp. 504, 510, 512. The maltodextrins used in the practice of this invention usually have a dextrose equivalent less than 10, and often the DE is no greater than about 5. It is particularly preferred to employ maltodextrins with a DE between about 2 and about 10. These maltodextrins can form thermoreversible gels with water, accounting for the fact that "rendering" occurs upon heating, i.e., the gel begins to melt somewhat, and the maltodextrin syrup leaks out. We have found that a blend of potato dextrins of DE 4–7 and corn dextrins of DE 2–5 is particularly effective, especially when used in a weight ratio from about 1:1 up to about 1:3. The particular combination of potato and corn dextrins has been chosen because the combination has a short texture, which has been found preferable to a long texture product. As further explanation, shortening as commonly used is a fatty substance used in baking to give a light crisp texture. This results from the formation by the shortening agent of a lubricating layer between the particles of flour giving the cooked product a less resilient and flaky structure. Starch hydrolysates of DE $\geq 10$ do not have this coating and tenderizing effect, and can be considered as an opposite to shortening. Their texture when hydrated is glue-like, sticky, stringy and can be referred to as a "long" texture, such as in taffy or mozzarella cheese. Unhydrolyzed starches have neither long nor short textures, but as hydrolysis occurs they become longer textured, all the way until they convert to glucose syrup, which is very stringy and sticky. If higher DE dextrins are used the subsequent meat products are sticky, tough and tend to be dry tasting and difficult to swallow. Excessive shortening yields crumbly mealy meat products, so the balance in using these components needs to be controlled if we are to deliver the appropriate sensory characteristics.

A unique aspect of our combination of the foregoing maltodextrins is that either maltodextrin alone is more stable, with respect to gel formation, than the combination of the two. It is important that the maltodextrins melt on heating as does a rendered animal fat, and a degree of control is possible by adjusting the ratios of the various maltodextrins in combination or alone permitting particular customization of the fat mimetic for particular applications. The combination of maltodextrins forms from about 10 up through about 30 weight percent of the finished product. Where the finished product contains less than 10 weight percent maltodextrins there is found to be insufficient solids in the system. Where the product contains greater than about 30 weight percent maltodextrins there are manufacturing difficulties arising mainly from the fact that water is bound too tightly. It is preferred that the maltodextrins in this variant of our invention be present in the range between about 25 and 30 weight percent, preferably at about 27 weight percent. It may be mentioned in passing that it has been found quite advantageous for the final product to have a total of approximately 31 weight percent solids (vide infra).

It also is possible to have starches, either native or modified food starches (i.e., partially hydrolyzed starches) of DE=0—see, e.g., "Food Carbohydrates," D. R. Lineback and G. E. Inglett, Editors, Avi Publishing Co., Connecticut, 1982, pp. 248 et. ff. —as a component in combination with the aforementioned maltodextrins. Such starches are particularly useful in replacing some of the maltodextrins and yielding a clearer gel with less solids and good freeze thaw stability. As mentioned above in the context of short and long textures, starch is rather neutral. Starch can contribute additional structure to the gel piece, can improve freeze cyclic stability, and permits the cost savings arising from lower solids with no appreciable sacrifice in overall function. When starches of DE =0 are used in combination with maltodextrins they may be used at a concentration as low as about 0.5 weight percent and as high as about 12 weight percent. The relative amounts of modified food starch and maltodextrins are dependent variables. For example, if starch is used in the range of 0.5–2 weight percent a suitable range of maltodextrins is from about 30 down to about 10 weight percent. With starch in the range of 2–6 weight percent the amount of maltodextrins is from about 20 down to about 5 weight percent. As a rough rule of thumb, a total of 12–20 weight percent maltodextrins and starch is near optimal for starch usage in the range of 2–6 weight percent.

Another component in the product of our invention is a matrix structure forming agent, preferably an alginate, which affords a rigid structure insensitive to heat. That is, the alginate provides a three-dimensional matrix which holds water and the dissolved maltodextrins. An apt analogy is that of a sponge; when pressure is put on a wet sponge the liquid runs out but the basic structure of the sponge remains. The product of our invention may be viewed as a sponge where alginate provides the network or matrix of the sponge and heat causes the liquid contained within the matrix to escape. However, after the liquid runs out the alginate matrix remains, which is an important characteristic since it imparts chewiness to the meat product. It is important to understand that alginate does not bond with the maltodextrins or starches in the network but merely entrains the latter. Alginate is present in our invention at a concentration from about 0.1 up to about 5 weight percent based on our finished product, more usually at a concentration between about 1 and about 3 weight percent, more desirably in the range of 1.5 to 2.5 weight percent, with a level near 2 weight percent particularly effective.

The most desirable attribute of algin of significance to our invention is its ability to form heat resistant gels which will not melt down and run out of a meat product while cooking, a heat stability essential for our invention. There are relatively few matrix structure forming agents which can set a thermally resistant gel, therefore there are only a few agents which can substitute for alginate. Gum tragacanth, pectin, konjac flour, some modified starches, albumin and some vegetable proteins are suitable, as of course are meat proteins. In general, matrix structure forming agents may be used in an amount as low as about 0.1 weight percent, based on our finished product, up to as high as about 5 weight percent.

The solids content of our animal fat replacement product can vary over a broad range but most desirably is from about 15 up to about 35 weight percent based on our finished replacement product. As previously mentioned, a solids content of about 31 weight percent, or nominally in the 30–32 weight percent range, often is preferred. Thus, it is seen that our fat replacement product is 65–85 weight percent water, which is a desirable replacement for fat.

The animal fat replacement product of our invention also may contain other components which serve as additives often found in meat products currently on the market. That is, we have found our animal fat replacement product to be an excellent delivery vehicle for other agents normally added to meats and meat products. Thus our product also may contain such additives as preservatives, flavors and flavor enhancers, colors, browning agents, macronutrients, vitamins, enzymes, seasonings, natural and synthetic fats, fat substitutes, texturizers, binders, broth, antioxidants, meat extract, vegetable extract, and so forth. The foregoing are only representative of the additives which may be present in the animal fat replacement product of our invention and which are currently used as additives for meats and meat products and is not intended to be exhaustive of such materials.

Illustrative of the preservatives which may be added as a component are butylated hydroxyanisole (BHA), butylated hydroxytoluene (BHT), t-butyl hydroquinone (TBHQ), potassium sorbate, sodium benzoate, sodium nitrite, sodium erythorbate, propyl gallate and citric acid. Non-limiting examples of natural and/or artificial flavorings which may be used as added components include beef, chicken, turkey, pork, bacon, ham, honey, maple, brown sugar, maple sugar, hickory smoke, wood smoke, mesquite smoke, fruit flavors, and malt syrup.

The animal fat replacement product of our invention also may contain: flavor enhancers such as autolyzed yeast, torula yeast, hydrolyzed animal proteins, hydrolyzed vegetable proteins, monosodium glutamate, disodium inosinate, disodium guanylate, and monosodium glutamate substitutes; colors such as caramel colors, FD&C certified colors, extractives of annatto, paprika, and turmeric, canthaxanthin, titanium dioxide, alkanet, carotene, saffron, green chlorophyll, cochineal, and zinc oxide; browning agents including egg white, dextrose, reducing sugars, sucrose, brown sugar, and molasses; macronutrients exemplified by hydrolyzed proteins, fats, oils, carbohydrates, sodium salts, iron, calcium salts, sugars, and mineral supplements; vitamins such as vitamins A, $B_{12}$, $B_6$, C, D, E, K, niacin, thiamin, and riboflavin; and enzymes including aspergillus oryzea, papain, ficin, bromelin, and various proteases, lipases, and amylases.

Other additives which may be incorporated are: seasonings such as salt, sugar, dextrose, invert sugar, honey, corn syrup solids, wood smoke, vinegar, flavorings, spices, dehydrated vegetables, and vegetable and spice extractives; natural and synthetic fats exemplified by rendered beef fat, chicken fat, turkey fat, lard, bacon fat, medium chain triglycerides, malonate esters, sucrose polyesters, esterified propoxylated glycerols, alpha acylated glycerides, alkyl glycoside polyesters, vegetable oils, vegetable shortening, margarine and butter; fat substitutes such as microcrystalline starch, maltodextrin gels, oat maltodextrin, microparticulated pectin gel, microparticulated protein, and microcrystalline cellulose; texturizers including proteolytic enzymes, disodium phosphate, monosodium phosphates, sodium tripoly phosphate, sodium metaphosphate, aspergillus oryzea, potassium phosphates, and dietary fibers.

Other materials which may be used as additives to the product of our invention include: binders, such as agar-agar, algin, calcium lactate, bread, calcium reduced skim milk, carrageenan, carboxyl methyl cellulose, cereal, dried milk, isolated soy protein, sodium caseinate, whey protein concentrate, dried whey, tapioca dextrin, soy flour, wheat gluten, vegetable starch, xanthan gum, sodium and potassium phosphates; broth such as chicken, beef, pork, ham, turkey, vegetable, mushroom and celery; antioxidants exemplified by alphatocopherol, rosemary and sage extractives, BHA, BHT, TBHQ, ascorbic acid, calcium disodium ethylenediamine tetraacetic acid, sodium erythorbate, citric acid, and sodium citrate; and meat extracts such as hydrolyzed plasma, hydrolyzed meat protein, beef, pork, chicken and turkey extracts.

The following examples are only illustrative of our invention and do not limit it in any way.

EXAMPLE 1

Preparation of Animal Fat Replacement Product

The following is representative of the procedure employed. Water, alginate, maltodextrins, modified food starch (where used), and additional agents such as flavorings, coloring, preservatives, etc. were combined and heated under high shear mixing conditions to 165°–195° F. to effect a) complete hydration of the hydrocolloid, b) complete dissolution of the maltodextrins, c) complete gelatinization of the modified food starch if present, and d) pasteurization against yeasts and molds (spoilage organisms) in a swept surface heat exchanger. The hot solution was handled aseptically and was formed into distinct droplets. The latter can be effected by any of several means including but not limited to dropping through a sieve, pressurized spraying through an orifice, shear forming by cutting the flow mechanically through an orifice, and pressure pulsed flow through an orifice. Depending upon the method used for formation of the droplets, the droplets may be allowed to free fall into an osmotically balanced setting bath, or formed below the surface of the bath and released into the bath which contains an excess of free calcium ions. The membrane enclosed droplets were then removed from the setting bath by straining, rinsed with fresh water, drained and allowed to set overnight under refrigeration or until the core of each droplet was firmly set. Additionally, calcium ions can be added directly to the hot solution by direct incorporation of a suitable solution of calcium providing sufficient agitation of the hot slurry prior to the extrusion of the resultant gel which may take the shape of a sheet, rope, block or pellet. Once fully set, the gelled pieces can be either frozen immediately for storage and subsequent use, or may be directly incorporated into processed meats.

The gelled form is readily incorporated into processed meats, as it can be handled and processed similarly to animal fat with only minor processing changes, if any. If a distinct particle size is required, prechopping the gelled pieces may be required. This may be the case, for example, in a breakfast sausage style product. If the gelled pieces are to be used in a finely chopped meat emulsion product such as a frankfurter, we find advantageous incorporation of the gelled pieces roughly half way through the cutting process to prevent complete degradation of the gelled structure.

EXAMPLE 2

Reduced Fat Frankfurter

The following formulation is typical for preparation of a reduced fat frankfurter using the animal fat replacement product of our invention. As the formulation shows, use of our fat mimetic reduces the fat content in the finished product from almost 30% to under 7%.

|  | Regular | Reduced Fat |
|---|---|---|
| Meat Block |  |  |
| BEEF |  |  |
| Plate | 30.0 lbs. | 0 |
| 90 Trim | 20.0 lbs. | 37.0 lbs. |

-continued

|  | Regular | Reduced Fat |
|---|---|---|
| Dry Ingredients | | |
| Spice regular | 2.5 lbs. | 0 |
| Spice, reduced fat | 0 | 2.5 lbs. |
| Milk powder | 1.75 lbs. | 1.75 lbs. |
| Prague powder | 2.0 ozs. | 2.0 ozs. |
| Wet Ingredients | | |
| Ice | 5.0 lbs. | 5.0 lbs. |
| Fat mimetic | 0 | 13.0 lbs. |
| TOTAL | 59 lbs. 6 oz. | 59 lbs. 6 oz. |
| Fat content (10% shrink) | 29.7% fat | 6.9% fat |

Directions:

Combine all ingredients except fat mimetic. In bowl chopper, cut to 45° F. Add fat mimetic, if required, and continue cutting to 58° F. Stuff tightly and process as usual in smokehouse.

What is claimed is:

1. A method of reducing the animal fat content of a meat product comprising replacing at least a portion of the animal fat with a triglyceride- and ester-free animal fat replacement product consisting essentially of an aqueous gel of at least one maltodextrin having a dextrose equivalent between about 1 and about 20 entrained in a matrix formed by at least one matrix structure forming agent selected from the group consisting of an alginate, gum tragacanth, pectin, and konjac flour, said animal fat replacement product containing from about 10 to about 30 weight percent maltodextrins and from about 0.1 up to about 5 weight percent of matrix structure forming agent based on the animal fat replacement product.

2. The method of claim 1 wherein the matrix structure forming agent is an alginate.

3. The method of claim 1 wherein the maltodextrin is a mixture of potato and corn maltodextrins in a weight ratio from about 1:1 up to about 1:3.

4. The method of claim 1 wherein each maltodextrin has a dextrose equivalent less than about 10.

5. The method of claim 1 wherein each maltodextrin has a dextrose equivalent between about 2 and about 10.

6. The method of claim 1 wherein the total solids content of the animal fat replacement product is from about 15 up to about 35 weight percent.

7. The method of claim 1 wherein the total water content of the animal fat replacement product is from about 65 up to about 85 weight percent.

8. The method of claim 1 further including entrained within the matrix at least one other additive selected from the group consisting of preservatives, flavorings, coloring agents, browning agents, flavor enhancers, macronutrients, vitamins, enzymes, seasonings, texturizers, broth, binders, meat extracts, vegetable extracts, natural fats, synthetic fats, fat substitutes, animal proteins, and antioxidants.

9. The method of claim 1 wherein the maltodextrins have a dextrose equivalent between about 2 and about 10, and are present at a concentration between about 25 and about 29 weight percent, and wherein the matrix structure forming agent is an alginate present at a concentration from about 1.5 up to about 2.5 weight percent based animal fat replacement product.

10. A method of reducing the animal fat content of a meat product comprising replacing at least a portion of the animal fat with a triglyceride- and ester-free animal fat replacement product consisting essentially of an aqueous gel of at least one maltodextrin having a dextrose equivalent between about 1 and about 20 and starch having a dextrose equivalent of 0 entrained in a matrix formed by at least one matrix structure forming agent selected from the group consisting of an alginate, gum tragacanth, pectin, and konjac flour, said animal fat replacement product containing from about 5 to about 30 weight percent maltodextrins, from 0.5 up to about 12 weight percent of the starch and from about 0.1 up to about 5 weight percent of matrix structure forming agent based on the animal fat replacement product.

11. The method of claim 10 wherein the starch is a native or a modified food starch.

12. The method of claim 10 wherein each maltodextrin has a dextrose equivalent less than about 10.

13. The method of claim 10 wherein each maltodextrin has a dextrose equivalent between about 2 and about 10.

14. The method of claim 10 wherein the starch of the animal fat replacement product is present at a concentration from about 0.5 up to about 2 weight percent and the maltodextrins are present at a concentration from about 30 to about 10 weight percent based on the animal fat replacement product.

15. The method of claim 10 wherein the starch of the animal fat replacement product is present at a concentration from about 2 to about 6 weight percent and the maltodextrins are present at a concentration from about 20 to about 5 weight percent based on the animal fat replacement product.

16. The method of claim 10 wherein the matrix structure forming agent is an alginate.

17. The method of claim 10 further including entrained within the alginate matrix at least one other additive selected from the group consisting of preservatives, flavorings, coloring agents, browning agents, flavor enhancers, macronutrients, vitamins, enzymes, seasonings, texturizers, broth, binders, meat extracts, vegetable extracts, natural fats, synthetic fats, fat substitutes, animal proteins, and antioxidants.

18. The method of claim 10 wherein the maltodextrins have a dextrose equivalent between about 2 and about 10 and are present at a concentration:

between 10 and about 30 weight percent when starch is present at a concentration between 0.5 and 2 weight percent;

between 20 and about 5 weight percent when starch is present at a concentration between 2 and about 6 weight percent, and wherein an alginate is present at a concentration between about 1.5 up to about 2.5 weight percent based on the animal fat replacement product.

* * * * *